UNITED STATES PATENT OFFICE.

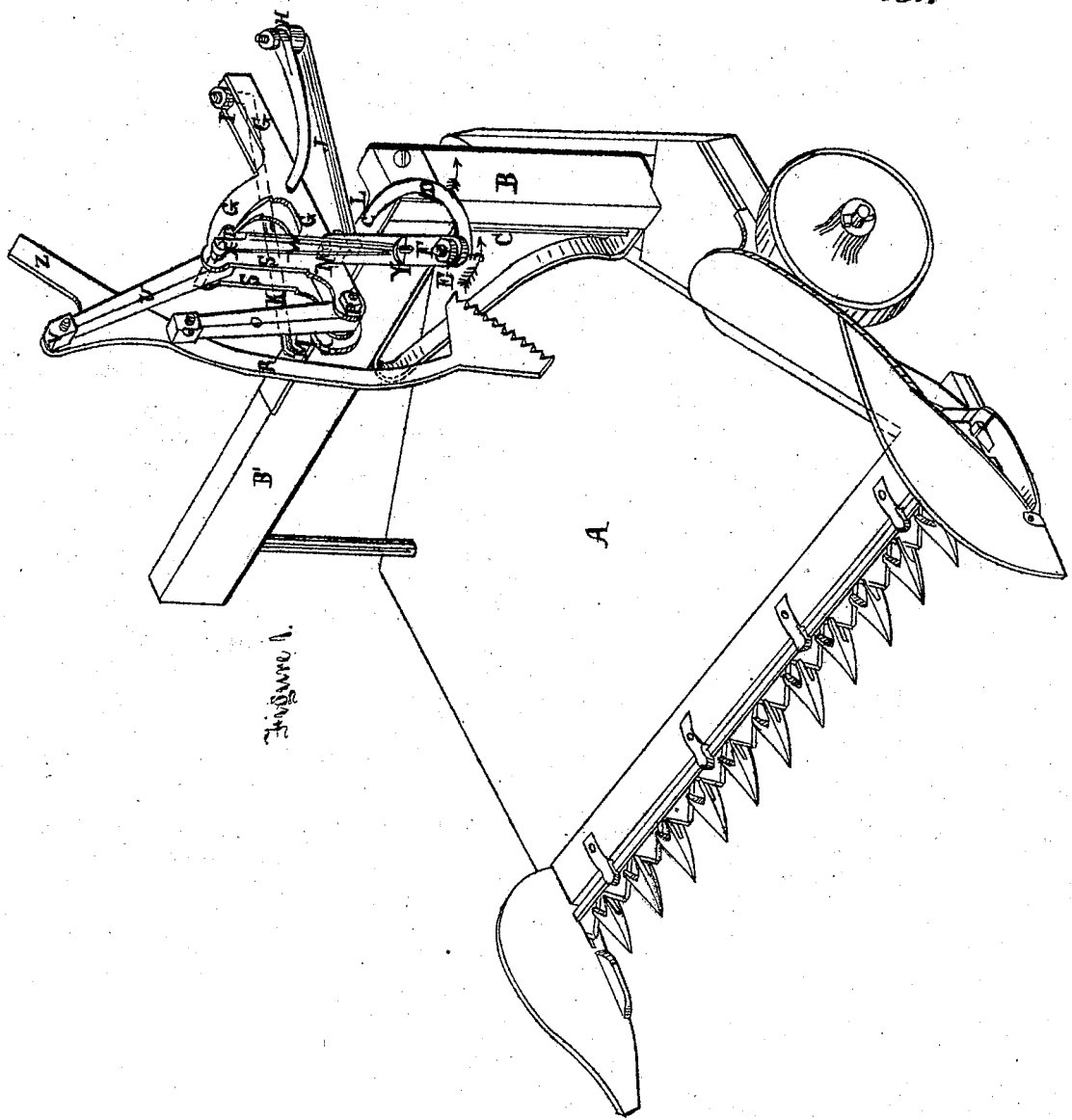

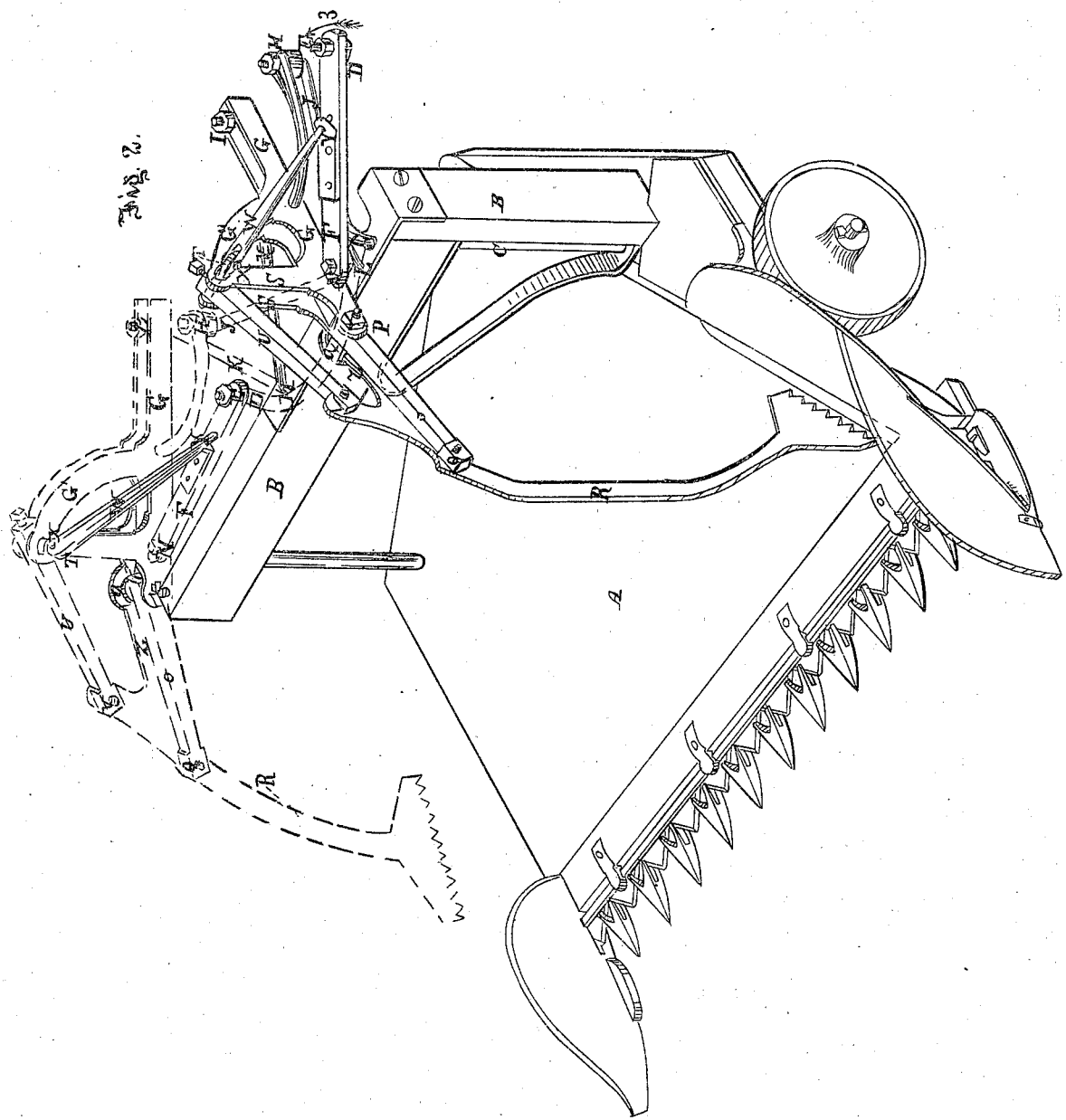

THEODORE F. KUMS, OF ROCKFORD, ILLINOIS, ASSIGNOR TO MARY MANNY, OF SAME PLACE.

IMPROVEMENT IN AUTOMATIC RAKES FOR HARVESTERS.

Specification forming part of Letters Patent No. 33,420, dated October 1, 1861.

*To all whom it may concern:*

Be it known that I, THEODORE F. KUMS, of Rockford, in the county of Winnebago and State of Illinois, have invented certain new and useful Improvements in Automatic Rakes for Harvesting-Machines, of which the following is a full, clear, and exact description, reference being had to the accompanying drawings, making part of this specification, in which—

Figure 1 represents a perspective view of my improved automatic raking mechanism, the rake being shown in position, ready to descend to the platform to seize the grain; and Fig. 2 represents a similar view of the same, showing the rake in two positions.

The black lines represent the rake when it has just descended to the platform, and the red lines the position of the same when the gavel has been swept from the platform.

In Letters Patent for improvements in automatic rakes, bearing even date herewith, I have described the construction and operation of an automatic rake moving across the platform of a reaping-machine in a complex path, or one compounded of a straight or nearly straight line and a curve. The object of my present improvements is to operate a rake moving in a like path, but without the sliding guides which determine its path, and without other friction than that of the pivot-joints for uniting the various parts.

In the drawings, A represents the platform of a reaper, upon the rear and outer corner of which is erected a frame-work, B, to support the raking mechanism. A rotating vertical shaft, C, supported in suitable bearings in this frame-work, gives motion to the raking mechanism. This shaft derives motion through suitable gearing from the driving-wheel. This shaft C carries upon its upper end a horizontal arm, D, pivoted at E to the horizontal link F, by means of which a vibratory motion is given to the rake-frame G. This frame is pivoted at H and I to the vibrating arms J and K, which have their centers of motion respectively at L and M in the frame B. The distance between the points H and I at which these arms are hinged to the rake-frame is less than the distance between their centers of motion L and M, and these points and distances are so arranged that the rake will move in a nearly straight path while sweeping the grain from behind the cutters, and will then describe a curve and push the grain off the platform, substantially as in the patent aforesaid. A vibrating motion is communicated to the rake-frame from the rotating arm D by means of the link F, which is pivoted at N to a stud projecting from the rake-frame, and the rake is thus caused to traverse the platform, guided in its complex path by the vibrating levers J and K. The rake is attached to the rake-frame and caused to vibrate with it by means of the arm O, which is pivoted at P to the frame and at Q to the rake-handle R, a short distance from its upper end, the rake being thus free to rise and fall in vertical planes.

The raising and lowering of the rake at the extremities of the platform is effected as follows: In the standard S are arranged bearings for the pin T, which is free to turn therein, and is firmly attached to the arm U, whose other end is pivoted at V to the upper end of the rake-handle. Thus, as the pin T is turned, the arm U is caused to rise and fall, carrying with it the rake-handle R and rake. One end of the pin T projects laterally from its bearings, is flattened, as shown, and embraced by the forked end of a diagonal link, W, to which it is pivoted by means of the pin X. The lower end of this diagonal link is free to turn in a socket, Y, in the horizontal link F. As the link F moves back and forth with the rotating arm D, the end of the diagonal link W follows its motions, turning upon its pivot X, so that each forward and rearward vibration causes it to perform a partial rotation upon its axis, turning the horizontal pin T in its bearings and raising and lowering the rake. An arm, Z, is attached to the rake-handle near its upper end, which, when the rake is in operation upon the platform, rests against the brace *a*, and enables the rake more effectually to resist lateral pressure. The operation of this raking apparatus is as follows: In the position shown in Fig. 1 the rotating arm D is near one of its dead-points with reference to the link F, and the vibrating arms J and K are near one extremity of their motion. The arm D rotates in the direction of the arrow 3. The rake-frame moves but little, but the diagonal link W, as it is carried back with the link F, is caused to partially rotate in its socket Y, so as to turn the pin T and lower the arm U, and consequently the rake descends to the platform and the apparatus assumes the position shown by black lines in Fig. 2. The dead-point of D and F is now passed, and as the arm D continues its rotation, the vibrating arms J and K begin to move, carrying the rake-frame over the platform and thus causing the rake to sweep the grain from behind the cutters. During this movement the diagonal link W slightly turns upon its pivot X, but has no motion upon its axis in the socket Y. When the grain has been moved from behind the cutters, the direct path of the rake is completed, and the gavel is now to be swept off the platform by the rake in a curved path. At this time one of the vibrating arms, K, is at the extreme of its motion in this direction. As D and F approach the dead-points of their motion, the arm J swings the rake-frame and rake around upon the point I as a pivot, and the gavel is deposited upon the ground. The mechanism now assumes the position shown by red lines in Fig. 2. The arms J and K are now both at the extreme of their motion. The second dead-point of the arm D and link F has been reached, and the rake is in readiness to be raised and returned with the rake-frame over the platform. As the arm D continues to rotate, the frame is drawn back across the platform, while the diagonal link W, partially rotating upon its axis as its lower end moves forward, turns the pin T, which raises the arm U, and consequently the rake is elevated above the platform. The link W now ceases to rotate upon its axis, and the further rotation of the arm D merely carries the frame and rake farther across the platform until they reach the position shown in Fig. 1, when the rake is again ready to descend to the platform to sweep off another gavel of grain.

What I claim as my invention, and desire to secure by Letters Patent, is—

1. The combination of the diagonal link W, the connecting-link F, and the vibrating arms J and K, or their equivalents, substantially as described, and for the purposes specified.

2. The combination of the diagonal link W, the connecting-link F, and rocking pin T, or their equivalents, substantially as and for the purposes herein described.

In testimony whereof I have hereunto subscribed my name.

T. F. KUMS.

Witnesses:
ROB. H. TINKER,
WM. A. KNOWLTON.